(12) United States Patent
Cotterell et al.

(10) Patent No.: US 12,348,523 B2
(45) Date of Patent: Jul. 1, 2025

(54) METHOD AND SYSTEM FOR WORKFLOW ATTESTATION

(71) Applicant: Shopify Inc., Ottawa (CA)

(72) Inventors: Edmond Cotterell, Ottawa (CA); Guillaume Jacques, Embrun (CA); Nicholas Taylor, Smith Falls (CA)

(73) Assignee: Shopify Inc., Ottawa (CA)

( * ) Notice: Subject to any disclaimer, the term of this patent is extended or adjusted under 35 U.S.C. 154(b) by 398 days.

(21) Appl. No.: 17/711,586

(22) Filed: Apr. 1, 2022

(65) Prior Publication Data
US 2023/0319049 A1    Oct. 5, 2023

(51) Int. Cl.
*H04L 9/40*        (2022.01)
*G06Q 30/016*      (2023.01)

(52) U.S. Cl.
CPC ......... *H04L 63/102* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 9,792,782 B1 * | 10/2017 | Basu | G07F 19/203 |
| 11,430,269 B1 * | 8/2022 | Szabo | G06Q 10/087 |
| 2013/0326614 A1 | 12/2013 | Truskovsky et al. | |
| 2015/0261956 A1 | 9/2015 | Anderson et al. | |
| 2016/0127351 A1 | 5/2016 | Smith et al. | |
| 2021/0120002 A1 * | 4/2021 | Fujii | H04L 63/102 |
| 2022/0198538 A1 | 6/2022 | Francis et al. | |
| 2023/0245109 A1 * | 8/2023 | Srivastava | G06Q 20/4012 |
| | | | 705/40 |

OTHER PUBLICATIONS

International Search Report and Written Opinion, PCT/CA2023/050242, Mailed May 17, 2023.

* cited by examiner

*Primary Examiner* — Christopher C Harris
(74) *Attorney, Agent, or Firm* — Moffat & Co

(57) ABSTRACT

A computer implemented method for granting access to secure resources, the method including receiving at a computer system from a secondary computing device, a ticket providing access parameters for a secure resource; receiving an access request for the secure resource from a verified user; confirming that the access request complies with the access parameters provided by the ticket; and generating an access token, the access token usable by the verified user for accessing the secure resource.

16 Claims, 9 Drawing Sheets

FIG. 2

METHOD AND SYSTEM FOR WORKFLOW ATTESTATION

FIELD OF THE DISCLOSURE

The present disclosure relates to granting access to a secure resource and in particular relates to the granting of temporary access to a defined portion of the secure resource.

BACKGROUND

A customer may contact a help desk support to obtain assistance with some aspect of their account. In order to assist the customer, the help desk agent may need to obtain access to a secure area or resource that is typically only available to the customer. For example, this may apply to merchants on an electronic commerce platform who need assistance with their shops. However, it may also apply to situations such as a customer contacting their bank, among other options.

SUMMARY

Traditional authentication systems use role-based access control (RBAC) or attribute-based access control (ABAC), both of which depend on relatively static settings. The need is for a more dynamic system to limit access to specific context, but also remain flexible enough that support agents can access what they need when they need it to support customers. For example, it is a problem to provide access to the entire support team when access should be granted to only the specific agent(s) working on the support engagement.

Further, in some cases, access may need to be passed to other support agents. For example, a call may be escalated to a Tier 2 support and the Tier 2 support agent may need access to the customer's space.

In this regard, a system for better access management into secure work areas is needed.

In one aspect, a computer implemented method for granting access to secure resources is provided. The method may include receiving at a computer system from a secondary computing device, a ticket providing access parameters for a secure resource. The method may further include receiving an access request for the secure resource from a verified user. The method may further include confirming that the access request complies with the access parameters provided by the ticket and generating an access token, the access token usable by the verified user for accessing the secure resource.

In some embodiments the secondary computing device may be trusted by the computer system.

In some embodiments the secondary computing device may correspond to a customer assistance portal.

In some embodiments, the access parameters may identify a role for a user, and the confirming that the access request complies with the access parameters may include checking that a role of the verified user matches the role in the access parameters.

In some embodiments the access parameters may include access to only a subset of the secure resource, and wherein the access token limits access to the subset of the secure resource.

In some embodiments the ticket may include a first identifier and the access request from the verified user may include the first identifier.

In some embodiments, the first identifier may be a personal identification number provided to a member of the secure resource.

In some embodiments the method may further comprise receiving a request from the verified user to grant access to a second verified user; confirming that the request from the verified user complies with the access parameters; and providing an access token usable by the second verified user for accessing the secure resource.

In some embodiments, the verified user may be a customer support agent.

In a further aspect, a computing device for granting access to secure resources may be provided. The computing device may comprise a processor and a communications subsystem. In some cases, the computing device may be configured to receive, from a secondary computing device, a ticket providing access parameters for a secure resource. In some cases, the computing device may be further configured to receive an access request for the secure resource from a verified user. In some cases, the computing device may be further configured to confirm that the access request complies with the access parameters provided by the ticket and generate an access token, the access token usable by the verified user for accessing the secure resource.

In some embodiments the secondary computing device may be trusted by the computing device.

In some embodiments the secondary computing device may correspond to a customer assistance portal.

In some embodiments the access parameters may identify a role for a user, and the confirming that the access request complies with the access parameters may include checking that a role of the verified user matches the role in the access parameters.

In some embodiments the access parameters may include access to only a subset of the secure resource, and wherein the access token may limit access to the subset of the secure resource.

In some embodiments the ticket may include a first identifier and the access request from the verified user may include the first identifier.

In some embodiments the first identifier may be a personal identification number provided to a member of the secure resource.

In some embodiments the computing device may be further configured to receive a request from the verified user to grant access to a second verified user; confirm that the request from the verified user complies with the access parameters; and provide an access token usable by the second verified user for accessing the secure resource.

In some embodiments the verified user may be a customer support agent.

In a further aspect, a non-transitory computer readable medium for storing instruction code may be provided. The instruction code, when executed by a computing device configured for granting access to secure resources, may cause the computing device to receive, from a secondary computing device, a ticket providing access parameters for a secure resource. The instruction code may further cause the computing device to receive an access request for the secure resource from a verified user. The instruction code may further cause the computing device to confirm that the access request complies with the access parameters provided by the ticket and generate an access token, the access token usable by the verified user for accessing the secure resource.

In some embodiments, the secondary computing device is trusted by the computing device.

BRIEF DESCRIPTION OF THE DRAWINGS

The present disclosure will be better understood with reference to the drawings, in which:

FIG. 2 is a block diagram showing an example interface for a merchant using the e-commerce platform of FIG. 1.

DETAILED DESCRIPTION

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The description herein utilizes the term "secure resource" to indicate an area for data storage on a computer system. Such secure area, for example, may be a merchant area of an electronic commerce system, where only authorized employees of such merchant would typically have access to the system. For example, the merchant storefront may include information such as products or services, prices, billing, orders and the like, for the merchant.

Access control to such secure resource may be managed by a first system, which may generate access tokens to grant access to all or parts of the secure resource.

A secondary system may, for example, be a customer support service using a different computer system. The secondary system may be used to provide support to merchants of the ecommerce platform. Such system may, typically, allow for communications in various forms such as by telephone, text message, or dedicated chat, with a support agent. Such secondary system is typically not created for network security.

In accordance with the embodiments of the present disclosure, a trust relationship may exist between the first system and the secondary system, whereby the first system may trust tickets or attestations supplied by the secondary system.

More broadly, a plurality of systems may exist around the first system, each with a different purpose. A secondary system may thus have business logic or workflows, some of which require access to data systems. These systems interact with the first system which grants and denies accesses. For example, a second system may involve a helpdesk. A third system may involve an auditing system. Other systems may also exist. In this case, trust relationships may exist between the first system and each of the remaining plurality of secondary systems.

As described below, any of the second, third or other systems may create tickets or attestations which allow for an agent having a role with such second, third or other system, to obtain access to the first system.

Each aspect is described in more detail below.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
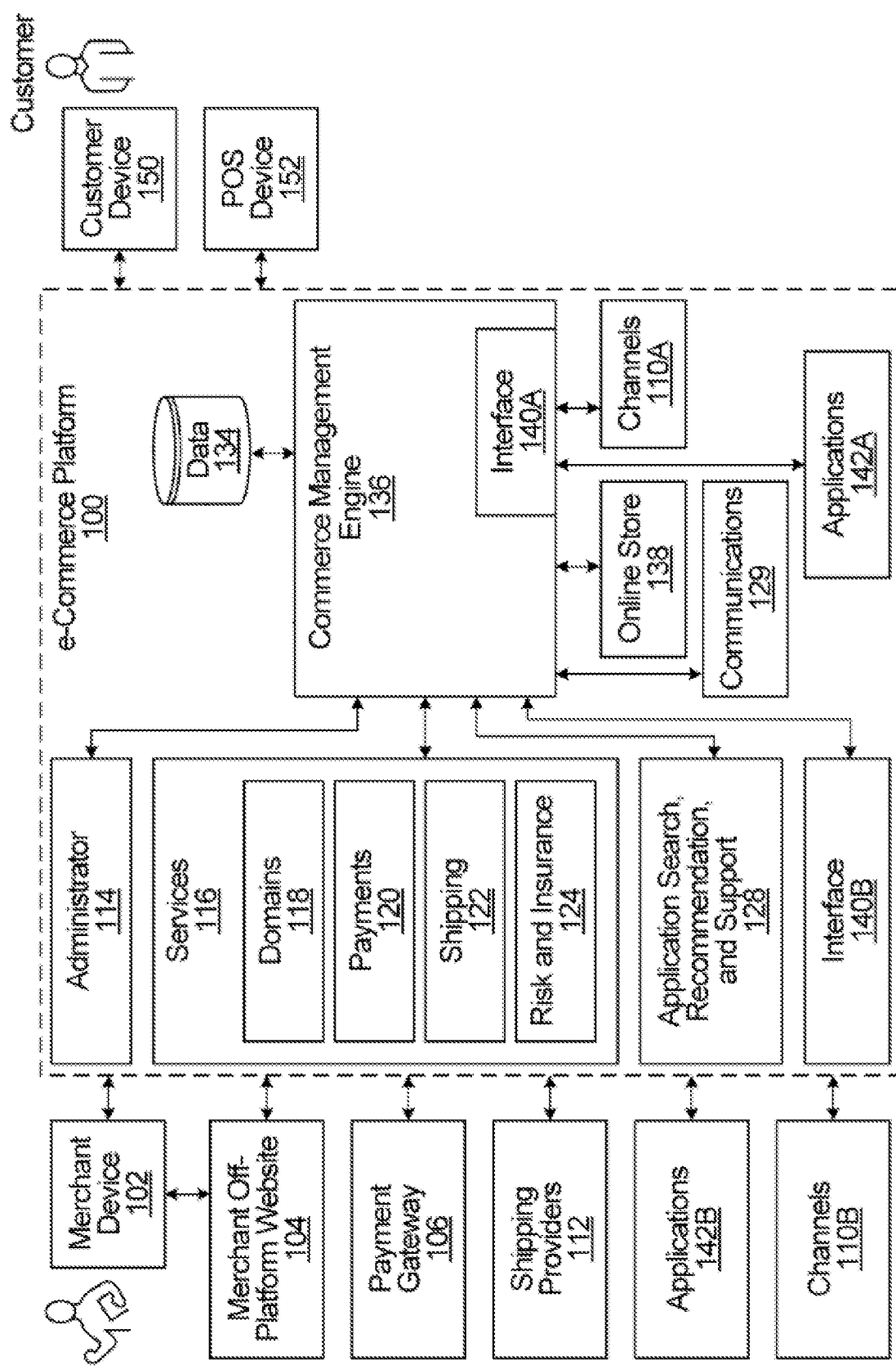
FIG. 1 is a block diagram showing an example e-commerce system capable of being used with the embodiments of the present disclosure.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
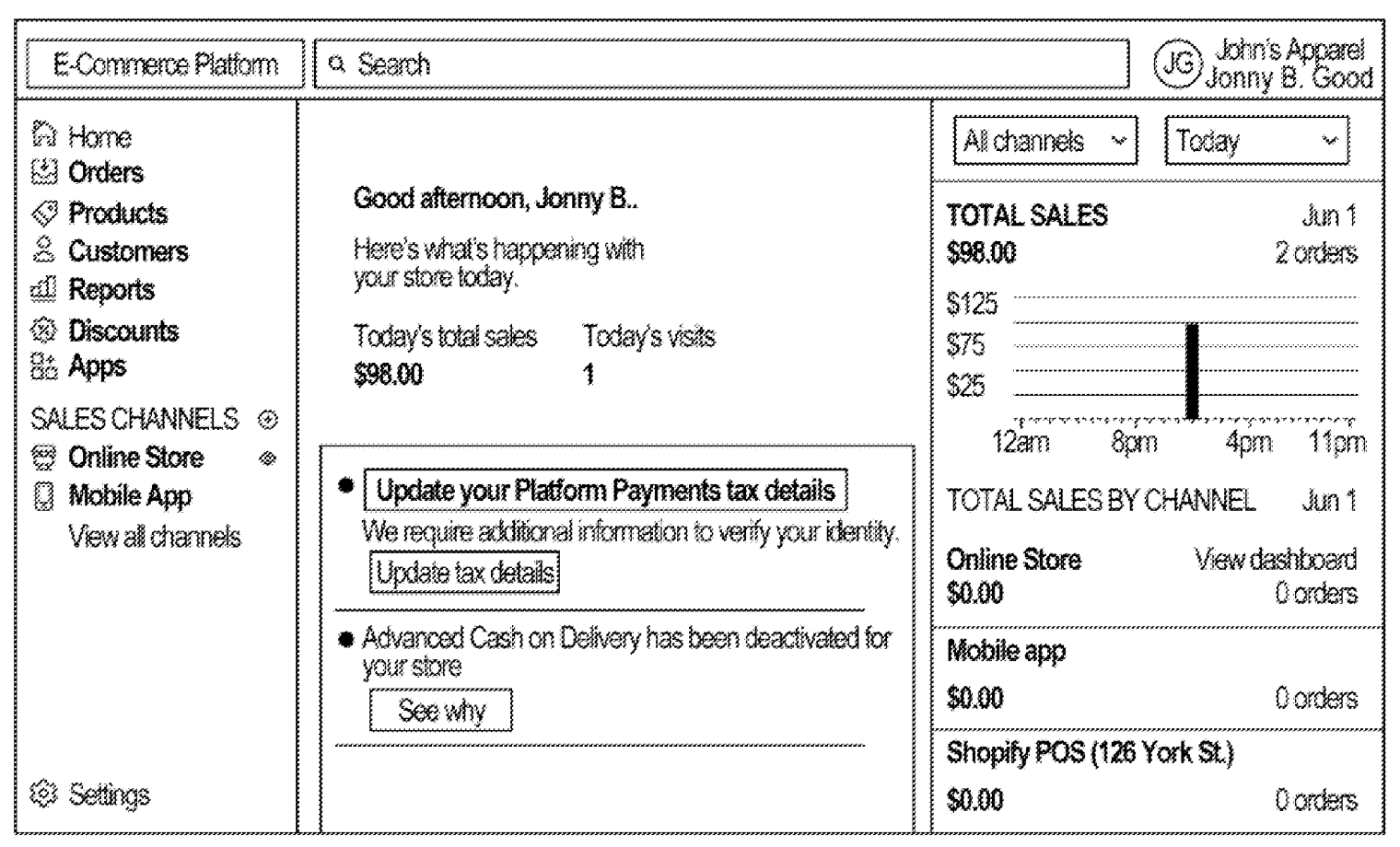

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Secondary Systems

In accordance with the embodiments of the present disclosure, a secure resource may exist which would only grant access to authorized users. For example, in one embodiment the secure resource may be an electronic storefront in an ecommerce platform. However, the present disclosure is not limited to ecommerce platforms as the secure resource, but rather the use of an ecommerce platform is provided for illustration purposes. Thus, in one case, the secure resource could be the electronic storefront shown with regard to the embodiments of FIGS. 1 and 2.

Access control to such secure resources may be managed by a first system, which may generate access tokens to grant access to all or parts of the secure resource.

A plurality of systems may exist around the first system, each with a different purpose. For example, the second system may involve a helpdesk. A third system may involve an auditing system. Other systems may also exist. In the present disclosure, these are referred to as secondary systems, and the use of a help desk as the secondary system is provided for illustration purposes. The help desk example is however not limiting, and other secondary systems could equally be used in accordance with the embodiments of the present disclosure. Such secondary systems may have business logic or workflows, some which would require data access to data systems. These systems interact with the first system, which grants and denies accesses. In this regard, trust relationships may exist between the first system and each of the remaining plurality of secondary systems.

Figure 3:
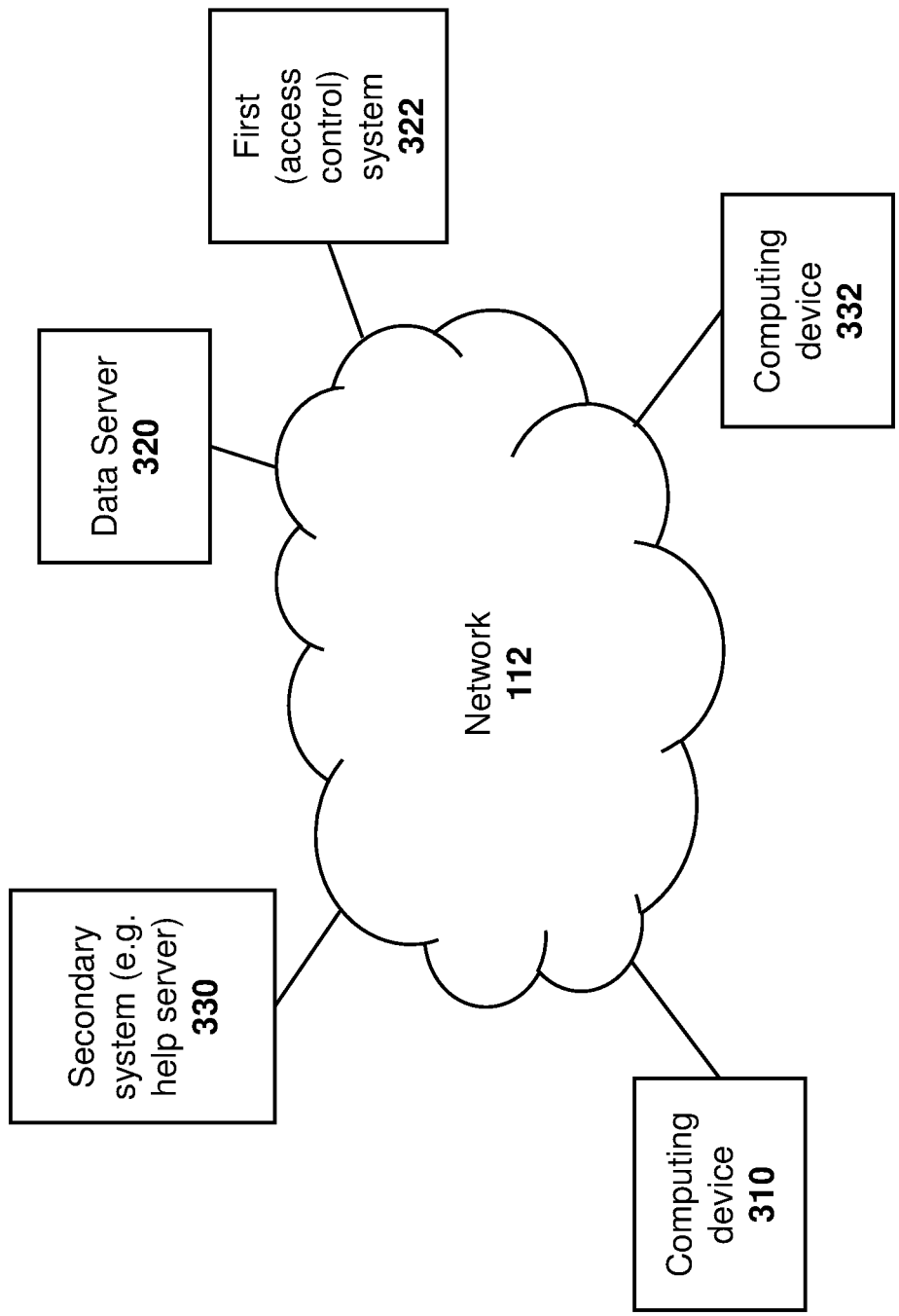
FIG. 3 is a block diagram showing various computing devices in accordance with the embodiments of the present disclosure.

For example, reference is now made to FIG. 3, which shows a simplified network diagram having the various components of embodiments of the present disclosure. For example, in the embodiment of FIG. 3, a computing device 310 may be the computing device used by a merchant to interact with the ecommerce platform.

In this case, computing device 310 may utilize a network 312, such as the Internet or any wide or local area network, to communicate with a data server 320. Data server 320 may be any computing device or cloud service capable of storing data as a secure resource. For example, computing device 310 may be merchant device 102 from FIG. 1, and data server 320 may host the e-commerce platform 100 from FIG. 1.

Access to the secure resource on data server 320 may be controlled by a first system 322, also referred to as an access control system. In some cases, the first system 322 may be part of the data server 320. In other cases, it can be a separate computing device.

Further, in the embodiment of FIG. 3, a secondary system 330 may exist. For example, such secondary system may be one or more servers or cloud services for a helpdesk, audit service, etc.

Computing device 332 may be used by a support agent, who may log into the secondary system 330 and be verified into such secondary system.

Secondary system 330 may have certain business logic and functionality that typically would allow for the contact by a customer or merchant to the help desk, the opening and tracking of tickets, among other functionality. However, such business logic and functionality would typically not extend to providing access to any secure resources.

In accordance with the embodiments of the present disclosure, a merchant that is communicating with a support agent over the support system may grant access to the support agent through a variety of means.

Various examples are provided for illustration below, including contacting the support system by telephone, by third party messaging application, or through the secure resource itself. Each are described below.

Telephone Support

If access to a help desk is via telephone, the merchant may call the customer support. Either before or during the call, the merchant may login to a help center using the merchant's credentials.

Figure 4:
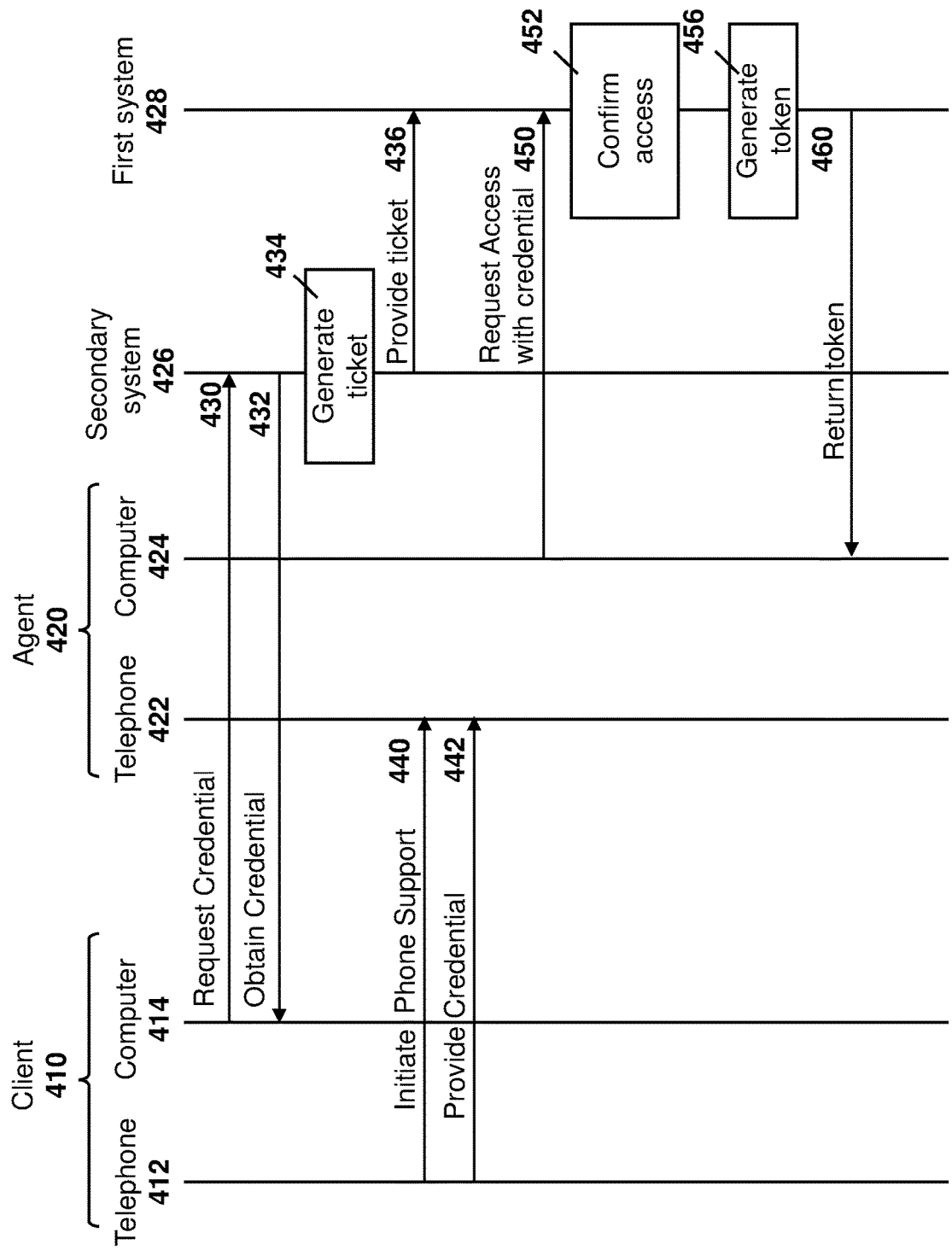
FIG. 4 is a dataflow diagram showing the obtaining of a token to access a secure resource of a client by an agent utilizing telephone support.

Such login may allow the merchant to receive authorization credentials such as a personal identification number (PIN) or other similar credential. This PIN or authorization credential may be used as an attestation for the support agent to grant the support agent access to the secure resource. Reference is now made to FIG. 4.

In the embodiment of FIG. 4, a customer or client 410 may have access to a telephone 412 and a computer 414. Similarly, a support agent 420 may have access to a telephone 422 and a computer 424. In each case, the telephone may be separate from or part of the computer 414 or 424.

A secondary system 426 may be the help system on which the client 410 has an account and on which an agent 420 may further be capable of authenticating themselves. The agent 420 is thus verified with the secondary system 426.

As indicated above, a first system 428 may be used for access control to the secure resource.

Prior to or after initiating a telephone support call, the client 410 may utilize computer 414 to request a credential from secondary system 426, as shown with message 430. In this case, client 410 would typically have to authenticate to the secondary system 426 for the secondary system 426 to be able to identify client 410.

The requesting of the credential in message 430 may, in one embodiment, simply request that a personal identification number for a telephone support call, or other similar credential, be issued to client 410.

In some embodiments, the merchant may limit the scope of access being granted to the support agent concurrently when requesting the credential. For example, message 430 may include more than a single message, but rather, an interaction with secondary system 426 in which configuration parameters may be entered for the support call. For example, if the merchant has a question about a particular order, then the merchant may grant access to only that particular order to the support agent. In other cases, the configuration may grant access to all orders in the merchant's site to the support agent. In other cases, the configuration may fully grant the agent access to the entire merchant site. Other options for configuration are possible.

In some cases, default access parameters may be stored for each merchant, and each merchant may configure such access parameters.

Based on the request and configuration of message 430, the secondary system 426 may generate and return a credential to the client 410 through computer 414. When using telephone support, such credential may be a number such as a personal identification number in some cases. However, the present disclosure is not limited to a PIN.

In some cases the PIN is used in addition to a merchant identifier to identify the merchant. In some cases, the authorized PIN may be a global PIN that both authenticates and identifies the merchant over a specific time period. For example, the help centre may track the PINs that have been issued and the length and/or duration of the PINs can be such that each PIN uniquely identifies a merchant during the time period. This may be accomplished, for example, by utilizing a PIN length sufficiently long to ensure that the PIN is unique for the duration of the PIN validity.

The secondary system 426 may then return such credential or PIN, as shown with message 432.

When generating the credential, the secondary system 426 may further generate and provide a ticket to the first system 428 with access information associated with such credential.

For example, the ticket may include a role that the person trying to gain access must have, a timestamp for the duration of the access authorization, the PIN itself, areas of the secure resource for which the access may be granted, among other information. Specifically, if the secondary system 426 is a help desk system, then the agent trying to access the first system utilizing a credential may need to be associated with that secondary system and have a role in that secondary system. For example, if someone who was not a support agent tried to use the credential to access the first system, the ticket information may not match the role of the person attempting to access the system, and access may therefore be denied.

Thus, in the embodiment of FIG. 4, the ticket may be generated at block 434. An example ticket is shown in Table 1 below. This is merely provided for illustration purposes, and other tickets with more or less information could be generated.

TABLE 1

Example Ticket or Attestation

| Field | Information |
| --- | --- |
| Merchant ID | #10123456 |
| Credential | 12345 |
| Access Area | Billing |
| Access Role | Support |
| Expiry | Apr. 2, 12:32 UTC |

In Table 1, the merchant ID may be based on the client 410 logging into secondary system 426, and thus having an authenticated user ID or merchant ID.

The credential is the PIN or other credential that was generated by the secondary system 426.

The access area is the area of the secure resource that the client has granted the agent access to. Specifically, the secure resource may be divided into various areas which may have labels or tags associated therewith. In this case, the access area may include the entire secure resource, or one or more of the sub-areas of the secure resource. Thus, the access area may be an enumerated list of areas in some cases.

The access role may be either specified by the client 410 or based on the secondary system 426. Specifically, in some cases, the use of secondary system 426 to gain access to the secure resource may limit access to only those having a role in the secondary system.

The expiry time may be set by the secondary system for a specific length of time after the ticket is issued in some cases. In some cases, a timestamp of when the ticket was issued may be provided.

In some cases, the ticket may include only the merchant ID and the credential. In other cases other fields instead of, or in addition to, those described in Table 1 may be used in the ticket.

Once the ticket is generated, it may be provided to the first system 428 in message 436. Message 436 may be signed or encrypted by secondary system 426 in order to ensure message integrity at first system 428.

A client 410 may initiate a phone support call 440 from telephone 414 to the telephone 422 of agent 420. This may occur either before or after the request for the credential at message 430. As will be appreciated by those in the art, the phone support call could be sent to a general switchboard which may then assign agent 420 to the call.

During the call, the client 410 may be required to provide the credential to the agent 420, as shown with message 442. This may be done in several ways. In one case, the credential may be provided verbally to the agent 420. In another case, the agent 420 may switch to a verification mode in which the user may then input the credential into an automated system. In another case, at the initiation of the phone call, the user may be prompted to input the credential into an automated system. Other options are possible.

By providing the PIN or credential over the telephone, this effectively provides an attestation to the support agent, who can then use such attestation to obtain an access token to access the secure resource containing the merchant data.

Once the agent or the computer system of the agent has the credential, the agent may request access to the first system with the credential. This is shown with message 450. Message 450 may include information about agent 420. For example, in some cases, message 450 may flow through secondary system 426, which may then append the login information about the agent, including the agent's role, to the message before it is sent to the first system 428. In other cases, the agent 420 may have an account and be logged into the first system 428, which may then utilize such information to validate the agent 420 and the role of the agent 420. Other options are possible. Agent 420 is thus verified with the first system, either based on verification with the secondary system 426 or a separate verification with first system 428.

Message 450 may thus include the credential that was provided to client 410, along with information about agent 420. In some cases, message 450 would be trusted by the first system, for example based on signing of the message or access to the first system. Specifically, a trust relationship may exist between the first system 428 and the secondary system 426, and by signing messages at the secondary system 426, these messages may be trusted by the first system 428.

Once the first system 428 receives message 450, the first system 428 may confirm that access can be granted to the secure resource at block 452. For example, the action at block 452 may involve comparing the information in the ticket received at message 436 with the request for access with the credential message 450. In particular, the credential from message 450 may be compared with the credential from message 436 to determine whether the role of the agent matches the role in the ticket, that the credential has not expired, in some cases whether the merchant ID that may be provided with message 450 matches the merchant ID in the ticket received at message 436, among other options.

If access can be granted, the first system 428 may generate a token, as shown at block 456, which may be provided back to the agent 420 in message 460. In some cases, the token may be specific to the particular agent 420. In other cases, the token may be a user agnostic access token which would allow the token to be passed to other users, for example other support agents, supervisors, among others.

Subsequently, agent 420 may utilize the token to gain access to the secure resource or subset of secure resource for which the access is granted.

Every access to the system, along with a reason for such access, may be logged for auditing and security purposes.

After the support call ends, a timer may be invoked which, once expired, may revoke access. In some cases, the access may be revoked at the end of the support call. In other cases, due to follow up work that may be required, access may be granted for a specific time period after the call has ended.

In other cases, the timer may be set when the credential is created rather than after the support call ends. In this case, access credentials may be periodically renewed if the call is still in progress.

Access attempts after the time has expired are denied.

Therefore, using the system of FIG. 4, a client may grant access to an agent to a secure resource by utilizing a secondary system to provide credentials and tickets for attestation and parameters to the access control for the secure resource.

Application Support

Rather than a telephone support call, in other cases a text chat support or other application support may be provided. In this case, the merchant may again authorize a support agent to access their site. This can use PIN codes similar to that described above with reference to FIG. 4, or use in-band codes in a chat application. Again, the merchant may need to authenticate themselves to the support system.

Once a support agent receives the credential, this credential can be provided to the first system to gain access. The first system would have also received the ticket from the support system indicating various parameters such as the scope of access, duration of access, roles of the person trying to gain access, among other information.

Figure 5:
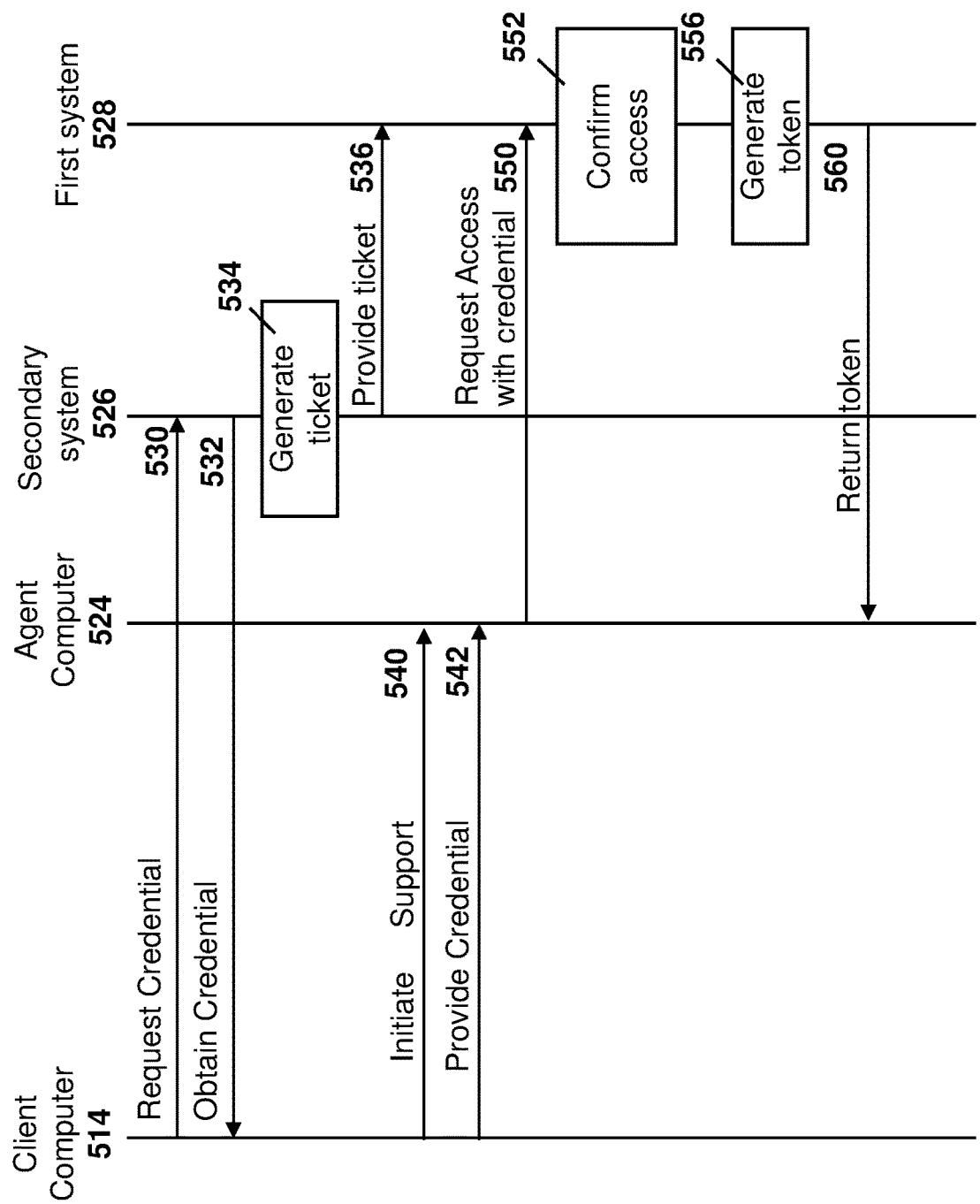
FIG. 5 is a dataflow diagram showing the obtaining of a token to access a secure resource of a client by an agent utilizing a chat application.

Specifically, reference is made to FIG. 5. In the embodiment of FIG. 5, a customer or client may use any computing device, shown as computer 514, to communicate with other computing systems. Similarly, a support agent may use any computing device, shown as computer 524 to communicate with other computing systems.

A secondary system 526 may be the help system on which the client has an account and on which an agent may further be capable of authenticating themselves.

A first system 528 may be used for access control to the secure resource.

In this case, a client may use an application such as a chat application, a browser chat, or similar application to contact support. The client may utilize computer 514 to request a credential from secondary system 526, as shown with message 530. In this case, the client would typically have to authenticate to the secondary system 526 for the secondary system 526 to be able to identify the client.

The requesting of the credential in message 530 may, in one embodiment, simply request a PIN or other similar credential, be issued to the client.

In some embodiments, the merchant may limit the scope of access being granted to the support agent concurrently when requesting the credential. For example, message 530 may include more than a single message, but rather, an interaction with secondary system 526 in which configuration parameters may be entered for the support chat. For example, if the merchant has a question about a particular order, then the merchant may grant access to only that particular order to the support agent. In other cases, the configuration may grant access to all orders in the merchant's site to the support agent. In other cases, the configuration may fully grant the agent access to the entire merchant site. Other options for configuration are possible.

Based on the request and configuration of message 530, the secondary system 526 may generate and return a credential to the client through computer 514.

In some cases, the authorized credential may be unique to the merchant over a specific time period. For example, the help centre may track credentials that have been issued and the length and/or duration of the credentials can be such that each credential uniquely identifies a merchant during the time period. This may be accomplished, for example, by utilizing a credential length or complexity sufficient to ensure that the credential is unique for the duration of the credential validity.

The secondary system 526 may then return such credential or PIN, as shown with message 532.

When generating the credential, the secondary system 526 may further generate and provide a ticket to the first system 528 with access information associated with such credential.

For example, the ticket may include a role that the person trying to gain access must have, a timestamp for the duration of the access authorization, the credential itself, areas of the secure resource for which the access may be granted, among other information. Specifically, if the secondary system 526 is a help desk system, then the agent trying to access the first system utilizing a credential may need to be associated with that secondary system and have a role in that secondary system. For example, if someone who was not a support agent tried to use the credential to access the first system, the ticket information may not match the role of the person attempting to access the system, and access may therefore be denied.

Thus, in the embodiment of FIG. 5, the ticket may be generated at block 534. An example ticket is shown in Table 1 above.

Once the ticket is generated, it may be provided to the first system 528 in message 536. Message 536 may be signed or encrypted by secondary system 526 in order to ensure message integrity at first system 528.

A client may initiate a chat support with message 540. This may occur either before or after the request for the credential at message 530. As will be appreciated by those in the art, the chat support could be to a generic address where it is assigned an agent.

During the chat, the client may be required to provide the credential in the chat, shown with message 542. This may be done in several ways. In one case, the credential may be provided in the text of the chat. In another case, the support call may have a secondary mode to input the credential. In another case, at the initiation of the chat, the user may be prompted to input the credential into the system. In other cases, message 532 may be captured and stored by the chat application and provided automatically to the agent. Other options are possible.

By providing the credential, this effectively provides an attestation to the support agent, who can then use such attestation to obtain an access token to access the secure resource containing the merchant data.

Once the agent or the computer system of the agent has the credential, the agent may request access to the first system with the credential. This is shown with message 550. Message 550 may include information about the agent. For example, in some cases, message 550 may flow through secondary system 526, which may then append the login information about the agent, including the agent's role, to the message before it is sent to the first system 528. In other cases, the agent may have an account and be logged into the first system 528, which may then utilize such information to validate the agent and the role of the agent. Other options are possible.

Therefore, message 550 includes the credential that was provided to client, along with information about the agent. In some cases, message 550 would be trusted by the first system, for example based on signing of the message or access to the first system.

Once the first system 528 receives message 550, the first system 528 may confirm that access can be granted to the secure resource at block 552. For example, the action at block 552 may involve comparing the information in the ticket received at message 536 with the request for access with the credential message 550. In particular, the credential from message 550 may be compared with the credential from message 536 to determine whether the role of the agent matches the role in the ticket, that the credential has not expired, in some cases whether the client ID that may be provided with message 550 matches the client ID in the ticket received at message 536, among other options.

If access can be granted, the first system 528 may generate a token, as shown at block 556, which may be provided back to the agent in message 560. In some cases, the token may be specific to the particular agent. In other cases, the token may be a user agnostic access token which would allow the token to be passed to other users, for example other support agents, supervisors, among others.

Subsequently, the agent may utilize the token to access the secure resource or subset of secure resource for which the access is granted.

Every access to the system, along with a reason for such access, may be logged for auditing and security purposes.

After the support chat session ends, a timer may be invoked which, once expired, may revoke access. In some cases, the access may be revoked at the end of the support chat session. In other cases, due to follow up work that may be required, access may be granted for a specific time period after the call has ended.

In other cases, the timer may be set when the credential is created rather than after the support chat session. In this case, access credentials may be periodically renewed if the chat session is still active.

Access attempts after the time has expired are denied.

Support Through the Secure Resource

In still further cases, support may be accessed from within an administration site from within the secure resource, such as within the merchant space of the ecommerce platform. In this case, the client may be provided with context-specific support information as well as the ability to interact with the support agent through the site. The area on the merchant's administrative platform from which the merchant asked for assistance may in some cases be used to set the scope of access to the support personnel.

Figure 6:
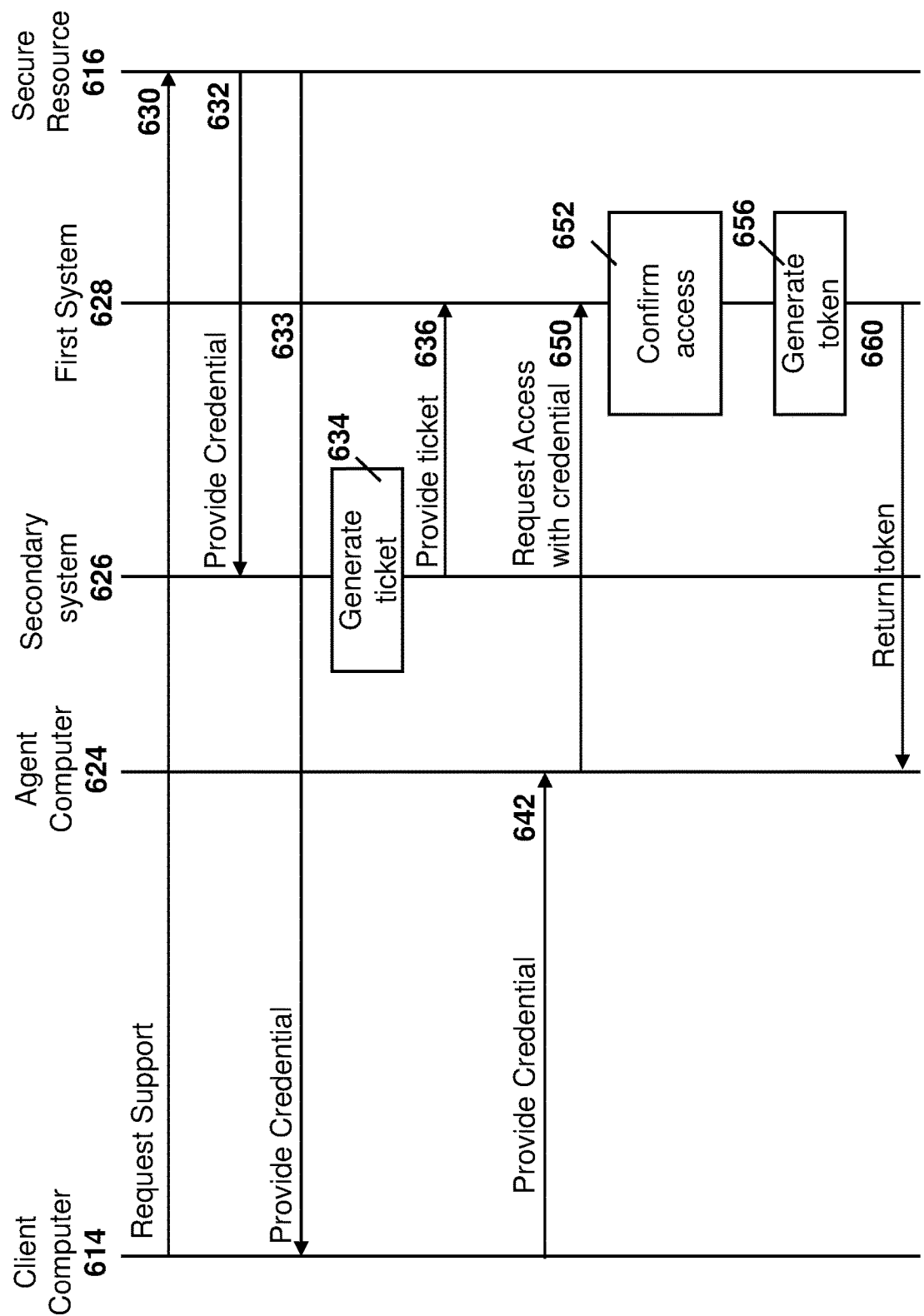
FIG. 6 is a dataflow diagram showing the obtaining of a token to access a secure resource of a client by an agent utilizing application specific support.

Specifically, reference is made to FIG. 6. In the embodiment of FIG. 6, a customer or client may use any computing device, shown as computer 614, to communicate with other computing systems, including computer systems hosting the secure resource 616. Similarly, a support agent may use any computing device, shown as computer 624 to communicate with other computing systems.

A secondary system 626 may be the help system on which the client has an account and on which an agent may further be capable of authenticating themselves.

A first system 628 may be used for access control to the secure resource 616.

In this case, a client may use an interface with the secure resource to contact support. The client may utilize computer 614 to request support as shown with message 630. In this case, the client would typically be authenticated to the secure resource 616.

The computing device at the secure resource, on receiving a support request 630, may provide a credential to both the secondary system in message 632 and to the client computer in message 633. However, in this case message 633 is optional, and in some embodiments the credential may be provided to an agent, either through the secondary system 626 or from secure resource 616 directly, without client intervention.

In some embodiments, the merchant may limit the scope of access being granted to the support agent concurrently when requesting the credential. For example, message 630 may include more than a single message, but rather, an interaction with secondary system 626 in which configuration parameters may be entered for the support call. For example, if the merchant has a question about a particular order, then the merchant may grant access to only that particular order to the support agent. In other cases, the configuration may grant access to all orders in the merchant's site to the support agent. In other cases, the configuration may fully grant the agent access to the entire merchant site. Other options for configuration are possible.

In some cases, access permissions may be preconfigured at the secure resource, for example by the merchant during a previous session.

In some embodiments, rather than the client configuring the access, context around the interaction within the secure resource may cause the configuration of the access. Specifically, if the client is within a billing area of the secure resource, and presses a help button, then access by the support agent may be restricted to the billing area based on the context of the request. Other options are possible.

In still further embodiments, rather than providing a credential in message 632 to the secondary system, a message from the secure resource 616 may indicate that the user requires support. In this case, the secondary system may generate the credential and provide it back to the client computer 614 if necessary.

In some cases, the authorized credential may be unique to the merchant over a specific time period. For example, the help centre or secure resource may track credentials that have been issued and the length and/or duration of the credentials can be such that each credential uniquely identifies a merchant during the time period. This may be accomplished, for example, by utilizing a credential length or complexity sufficient to ensure that the credential is unique for the duration of the credential validity.

When generating the credential, the secondary system 626 may further generate and provide a ticket to the first system 628 with access information associated with such credential.

For example, the ticket may include a role that the person trying to gain access must have, a timestamp for the duration of the access authorization, the credential itself, areas of the secure resource for which the access may be granted, among other information. Specifically, if the secondary system 626 is a help desk system, then the agent trying to access the first system utilizing a credential may need to be associated with that secondary system and have a role in that secondary system. For example, if someone who was not a support agent tried to use the credential to access the first system, the ticket information may not match the role of the person attempting to access the system, and access may therefore be denied.

Thus, in the embodiment of FIG. 6, the ticket may be generated at block 634. An example ticket is shown in Table 1 above.

Once the ticket is generated, it may be provided to the first system 628 in message 636. Message 636 may be signed or encrypted by secondary system 626 in order to ensure message integrity at first system 628.

Based on the request for help, a support session may be initiated with the support agent.

In some embodiments, during the support session the client may be required to provide the credential. This may be done in several ways. In one case, the credential may be provided in the support session, as shown with message 642. In another case, the support session may have a secondary mode to input the credential. In other cases, message 633 may be captured and stored by the support session and provided automatically to the agent. Other options are possible.

By providing the credential, this effectively provides an attestation to the support agent, who can then use such attestation to obtain an access token to access the secure resource containing the merchant data.

Once the agent or the computer system of the agent has the credential, the agent may request access to the first system with the credential. This is shown with message 650. Message 650 may include information about the agent. For example, in some cases, message 650 may flow through secondary system 626, which may then append the login information about the agent, including the agent's role, to the message before it is sent to the first system 628. In other cases, the agent may have an account and be logged into the first system 628, which may then utilize such information to validate the agent and the role of the agent. Other options are possible. Thus the agent is validated with the first system 628, either through the secondary system 626 or directly with the first system 628.

Therefore, message 650 would include with the credential that was provided to client, along with information about the agent. In some cases, message 650 would be trusted by the first system, for example based on signing of the message or access to the first system.

Once the first system 628 receives message 650, the first system 628 may confirm that access can be granted to the secure resource at block 652. For example, the action at block 652 may involve comparing the information in the ticket received at message 636 with the request for access with the credential message 650. In particular, the credential from message 650 may be compared with the credential from message 636 to determine whether the role of the agent matches the role in the ticket, that the credential has not expired, in some cases whether the client ID that may be provided with message 650 matches the client ID in the ticket received at message 636, among other options.

If access can be granted, the first system 628 may generate a token, as shown at block 656, which may be provided back to the agent in message 660. In some cases, the token may be specific to the particular agent. In other cases, the token may be a user agnostic access token which would allow the token to be passed to other users, for example other support agents, supervisors, among others.

Subsequently, the agent may utilize the token to access the secure resource or subset of the secure resource for which the access is granted.

Every access to the system, along with a reason for such access, may be logged for auditing and security purposes.

After the support session ends, a timer may be invoked which, once expired, may revoke access. In some cases, the access may be revoked at the end of the support chat session. In other cases, due to follow up work that may be required, access may be granted for a specific time period after the call has ended.

In other cases, the timer may be set when the credential is created rather than after the support chat session. In this case, access credentials may be periodically renewed if the chat session is still active.

Access attempts after the time has expired are denied.

Expanding Access

As indicated above, a support agent may have limited access to the secure resource. For example, a client may have restricted the support agent's access to a billing area, and the remainder of the electronic storefront may be inaccessible to the support agent. The remaining area may, for example, be redacted to prevent the support agent from seeing such information. In other cases, the restricted areas may be inaccessible to the support agent, for example by disabling links to those areas, among other options.

Figure 7:
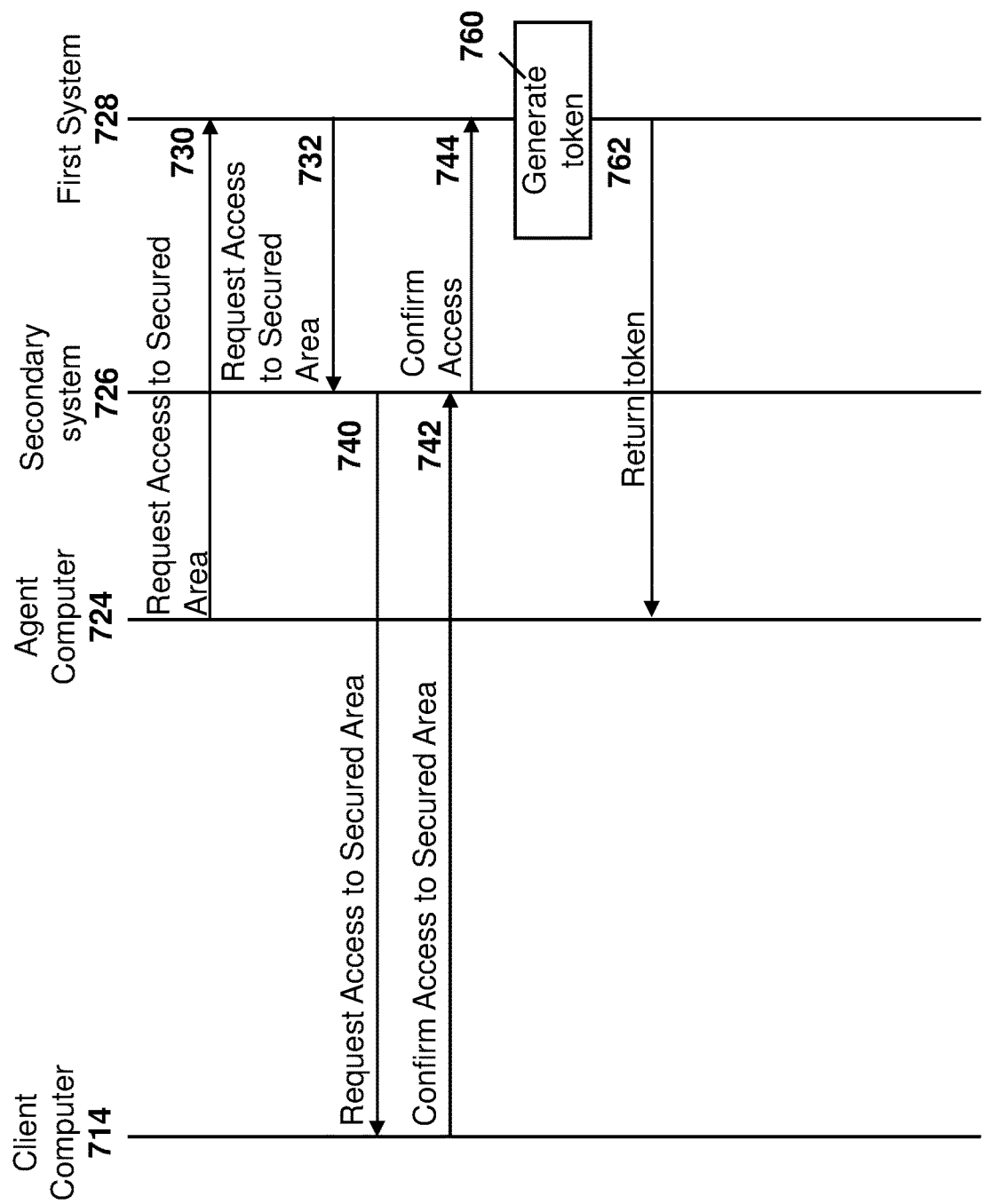
FIG. 7 is a dataflow diagram showing the obtaining of access to a secured area by an agent within a secure resource.

A support agent may discover that they need access to one of the restricted areas while working with the client. In this regard, in accordance with one embodiment of the present disclosure, access may be granted to that area. Reference is now made to FIG. 7.

In the embodiment of FIG. 7, a client computer 714 may communicate with a secondary system 726. Further, an agent computer 724 may communicate with the secondary system 726 and with the first system 728.

During a session, the agent may realize that they need access to areas for which permission was not granted. The agent may therefore request access to that area. This may occur, for example, by clicking on a redacted piece of data, clicking on a restricted link, among other options within the secure area. Such selection of restricted data may cause a request to access the secured area to be sent from the agent computer 724 to the first system 728, shown with message 730.

Based on the receipt of message 730, the first system 728 may send a request 732 to access the secured area to the secondary system 726. The secondary system 726 may then send the request to access the secured area to the client computer 714, shown with message 740.

The client may then confirm whether access is granted and if confirmation is granted, a confirmation message 742 may be sent back to secondary system 726. The secondary system 726 may then confirm access to the first system 728, shown with message 744.

In some embodiments, the first system 728 may then generate a new token, as shown at block 760 and return such token to the agent computer 724, as seen with message 762.

Subsequently, the agent may utilize the new token to access the restricted areas.

While the embodiment of FIG. 7 shows confirmation by a client, in some cases, messages 740 and 742 are optional and in this case the access may be granted without providing permissions from the client. Logging and/or reporting may be utilized to inform the client of such access.

Further, the embodiment FIG. 7 shows the generation of a new token at block 760. Instead, in some cases an existing token may be supplemented within the first system to allow access utilizing that first token to the restricted area. Other options are possible.

Thus, utilizing the embodiment of FIG. 7, added permissions may be granted and logged within the system to provide visibility on what was accessed and by whom.

Sharing Permissions

A first support agent that receives the ticket for authentication may, in some cases, require help from a second support agent. For example, a case may be escalated to a supervisor. In another example, a support case may have been directed to a design and layout department, but need assistance from someone in the financial department. Other options are possible.

In this case, the system may create an attestation link which may be provided to the second agent. This link could exist under a child attestation to the original attestation and could allow the second agent access to various parts of the merchant site within the first system.

Figure 8:
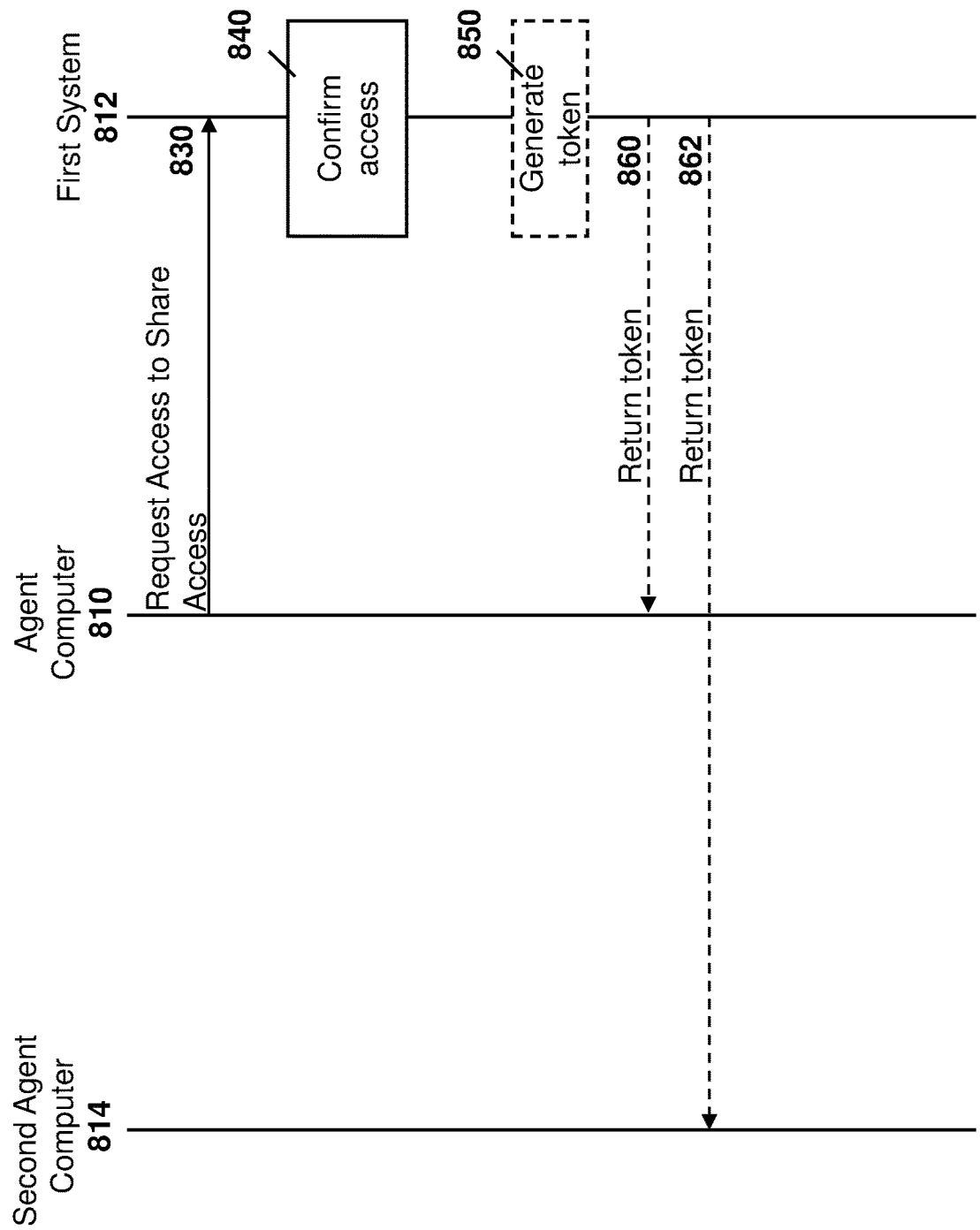
FIG. 8 is a dataflow diagram showing the sharing of access to a secure resource with a second agent by a first agent.

Reference is now made to FIG. 8. In the embodiment of FIG. 8, an agent may be assisting a client utilizing an agent computer 810. The agent may, at some point, realize that they need assistance from a second support agent. Such second support agent would be a verified user within the first system 812.

In this regard, the agent may send, through agent computer 810, a request to share access to the secure resource, shown with message 830. Message 830 may include various information, including the original attestation or token received by the first agent, information about the client such as a merchant identifier, information about the second agent to whom permission is being sought to be granted, and/or other information.

In some cases, message 830 may be sent through an application program interface (API), for example using a chat application.

The first system 812 may then confirm access at block 840. Confirmation of access may include determining whether the initial access permission and the role of the second agent match, along with the remaining conditions from the initial ticket.

For example, if the role of the second agent is that of a supervisor of the first agent, then this may grant a child access token to the supervisor for any file that one of their employees is working on. In some cases, the role of the second agent may be a peer of the first agent and thus permission may be granted. Other options are possible.

Assuming that access has been confirmed, the first system 812 may then, in some cases, generate a new token at block 850. However, the generation of the new ticket is optional, and in some cases the original ticket may be utilized for the second agent.

Once the token has been generated, it may be returned to either the first agent or the second agent. For example, as shown with message 860, the ticket may be returned as an attestation link to the first agent, who may then share the attestation link with the second agent. In some cases, message 860 may place the attestation within the chat or application being used by the first agent.

In other cases, the attestation link may be sent directly to the second agent through the second agent computer 814, as shown with message 862.

In some embodiments, the token returned with message 860 or message 862 may grant the same permissions as the permissions granted to the first agent. Specifically, the areas within the secure resource that were accessible by the first agent may be accessible by the second agent.

In other cases, the token returned with message 860 or message 862 may grant different permissions to the second agent. For example, if the second agent works in a different area of support, then different areas of the secure resource may be accessible by the second agent. If the second agent is a supervisor, the token returned with message 860 or message 862 may grant enhanced permissions to those permissions granted to the first agent. Other options are possible.

The token or attestation returned with message 860 or message 862 may be considered a child attestation to the original attestation or token and be logged as such. This could provide an audit trail for future review in some cases.

The access control and attestation workflow system of the embodiments of FIGS. 3 to 8 may work in near real-time to grant and deny access to resources when users request it.

Such system may provide some or all of a variety of benefits.

Tracking and Displaying which of Multiple Merchant Users Authorized Support:

As a result of the merchant-initiated support request, all agent accesses of the merchant's data or systems are recorded and made available to the merchant afterwards. The system provides to the merchant which merchant user account initiated/authorized the support engagement. This is useful for large merchants that have many user accounts for their employees to track which of them authorized the support request that led to support agents accessing or modifying the shop. One user may not be aware that the second user called in and had support adjust settings on the shop, this provides information to the first user that while the change was made by support, it was initiated/authorised by the second user.

Narrowing Scope of Access to Less than the Whole Shop:

While one implementation can allow support agent access to the entire merchant shop and all its data as a whole, further implementations may allow/deny access to data at a narrower scope within the shop. This can be implemented by an additional privacy layer that obfuscates/redacts subsets of data when presenting screens/pages to the support agent.

In this case when the support agent opens the store administration pages, they are not shown the exact view that the merchant sees. Certain elements such as financial data, customer data or other private data may be blanked out or otherwise redacted.

If there is a need for the customer support agent to view one of the redacted items they can unredact it and view it. This may be done by making additional requests for access to the merchant in some cases.

All these unredacting operations are recorded along with the trail of authorization/attestation. This audit trail may be visible to auditors, or to the merchant themself. As such the merchant may view what data was viewed by the support agent, as well as which support ticket that was related to, as well as the state of the support ticket at the time of access—this is done by tracing the attestations/authorizations.

Role-Based Child Attestations:

Within the support agent organization, there may be a manager/employee role relationship that also grants access in addition to the regular attestation flow. The manager role may be used to grant a manager access to any resources that their employees have received access to. This role based attestation is another type of child attestation.

Another role-based aspect may be that the scope of data accessible within the shop is limited based on the role of the support agent. As an example the support agent in the financial department may be given access to financial transaction data whilst the support agent in the design and layout department may be denied access to any financial transaction data.

Based on the above, a second system not typically used for access control may create tickets or attestations which may be shared both with the customer and with the first data system. Information within the ticket may be used to create access tokens which may be limited in the scope of access, time for access, role of the individual requesting access, among other options.

Computing Device

The above-discussed methods are computer-implemented methods and require a computer for their implementation/use. Such computer system could be implemented on any type of, or combination of, network elements or computing devices. For example, one simplified computing device that may perform all or parts the embodiments described herein is provided with regard to FIG. 9.

Figure 9:
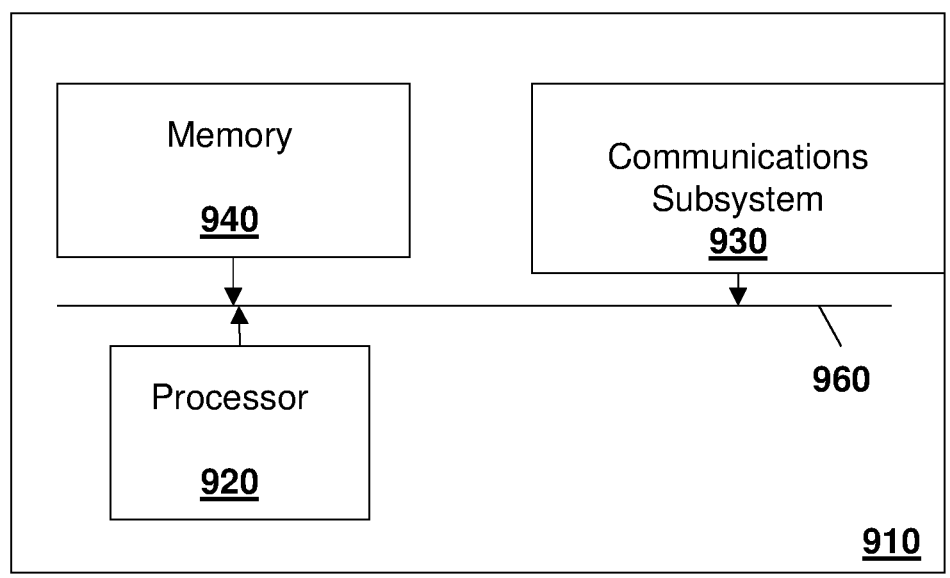
FIG. 9 is a block diagram showing a simplified computing device capable of being used with the embodiments of the present disclosure.

In FIG. 9, computing device 910 includes a processor 920 and a communications subsystem 930, where the processor 920 and communications subsystem 930 cooperate to perform the methods of the embodiments described herein.

The processor 920 is configured to execute programmable logic, which may be stored, along with data, on the computing device 910, and is shown in the example of FIG. 9 as memory 940. The memory 940 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 920 may also be implemented entirely in hardware and not require any stored program to execute logic functions. Memory 940 can store instruction code, which, when executed by processor 920 cause the computing device 910 to perform the embodiments of the present disclosure.

Alternatively, or in addition to the memory 940, the computing device 910 may access data or programmable logic from an external storage medium, for example through the communications subsystem 930.

The communications subsystem 930 allows the computing device 910 to communicate with other devices or network elements. In some embodiments, communications subsystem 930 includes receivers or transceivers, including, but not limited to, ethernet, fiber, Universal Serial Bus (USB), cellular radio transceiver, a Wi-Fi transceiver, a Bluetooth transceiver, a Bluetooth low energy transceiver, a GPS receiver, a satellite transceiver, an IrDA transceiver, among others. As will be appreciated by those in the art, the design of the communications subsystem 930 will depend on the type of communications that the transaction device is expected to participate in.

Communications between the various elements of the computing device 910 may be through an internal bus 960 in one embodiment. However, other forms of communication are possible.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer implemented method for granting access to secure resources, the method comprising:
   receiving at a computer system from a secondary computing device, a ticket providing access parameters for a secure resource, the ticket including a first identifier generated by the secondary computing device based on a request from an owner of the secure resource;
   receiving an access request for the secure resource from a verified user, the access request including the first identifier;
   confirming that the access request complies with the access parameters provided by the ticket;
   generating an access token, the access token usable by the verified user for accessing the secure resource;
   receiving a request from the verified user to grant access to a second verified user;
   confirming that the request from the verified user complies with the access parameters; and
   providing a second access token usable by the second verified user for accessing the secure resource.

2. The method of claim 1, wherein the secondary computing device is trusted by the computer system.

3. The method of claim 1, wherein the secondary computing device corresponds to a customer assistance portal.

4. The method of claim 1, wherein the access parameters identify a role for a user, and wherein the confirming that the access request complies with the access parameters includes checking that a role of the verified user matches the role in the access parameters.

5. The method of claim 1, wherein the access parameters include access to only a subset of the secure resource, and wherein the access token limits access to the subset of the secure resource.

6. The method of claim 1, wherein the first identifier is a personal identification number provided to a member of the secure resource.

7. The method of claim 1, wherein the verified user is a customer support agent.

8. A computing device for granting access to secure resources, the computing device comprising:
   a processor; and
   a communications subsystem,
   wherein the computing device is configured to:
      receive, from a secondary computing device, a ticket providing access parameters for a secure resource, the ticket including a first identifier generated by the secondary computing device based on a request from an owner of the secure resource;

receive an access request for the secure resource from a verified user, the access request including the first identifier;

confirm that the access request complies with the access parameters provided by the ticket;

generate an access token, the access token usable by the verified user for accessing the secure resource;

receive a request from the verified user to grant access to a second verified user;

confirm that the request from the verified user complies with the access parameters; and provide a second access token usable by the second verified user for accessing the secure resource.

9. The computing device of claim 8, wherein the secondary computing device is trusted by the computing device.

10. The computing device of claim 8, wherein the secondary computing device corresponds to a customer assistance portal.

11. The computing device of claim 8, wherein the access parameters identify a role for a user, and wherein the confirming that the access request complies with the access parameters includes checking that a role of the verified user matches the role in the access parameters.

12. The computing device of claim 8, wherein the access parameters include access to only a subset of the secure resource, and wherein the access token limits access to the subset of the secure resource.

13. The computing device of claim 8, wherein the first identifier is a personal identification number provided to a member of the secure resource.

14. The computing device of claim 8, wherein the verified user is a customer support agent.

15. A non-transitory computer readable medium for storing instruction code, which, when executed by a computing device configured for granting access to secure resources cause the computing device to:

receive, from a secondary computing device, a ticket providing access parameters for a secure resource, the ticket including a first identifier generated by the secondary computing device based on a request from an owner of the secure resource;

receive an access request for the secure resource from a verified user, the access request including the first identifier;

confirm that the access request complies with the access parameters provided by the ticket;

generate an access token, the access token usable by the verified user for accessing the secure resource;

receive a request from the verified user to grant access to a second verified user;

confirm that the request from the verified user complies with the access parameters; and provide a second access token usable by the second verified user for accessing the secure resource.

16. The non-transitory computer readable medium of claim 15, wherein the secondary computing device is trusted by the computing device.

* * * * *